US006729432B1

(12) United States Patent
Yao et al.

(10) Patent No.: US 6,729,432 B1
(45) Date of Patent: May 4, 2004

(54) RE-CONFIGURABLE CONTROL OF STEER-BY-WIRE SYSTEMS

(75) Inventors: Yixin Yao, Ann Arbor, MI (US); Behrouz Ashrafi, Northville, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/428,525

(22) Filed: May 2, 2003

(51) Int. Cl.$^7$ ............................................. B62D 5/04
(52) U.S. Cl. ..................... 180/402; 180/405; 180/446; 701/43
(58) Field of Search ................... 180/405, 443, 180/446, 402, 404; 701/41, 42, 43

(56) References Cited

U.S. PATENT DOCUMENTS

| | | | |
|---|---|---|---|
| 5,887,165 | A | 3/1999 | Martel et al. |
| 6,505,703 | B2 | 1/2003 | Stout et al. |
| 2002/0161499 | A1 * | 10/2002 | Radamis et al. ............. 701/41 |
| 2003/0019670 | A1 * | 1/2003 | Matz et al. .................. 180/6.2 |
| 2003/0114969 | A1 * | 6/2003 | Dominke et al. ............ 701/41 |
| 2003/0133526 | A1 * | 7/2003 | Millsap et al. ............. 375/354 |
| 2003/0230448 | A1 * | 12/2003 | Guldner et al. ............. 180/402 |

OTHER PUBLICATIONS

Krautstrunk, Alexander and Mutschler, Peter "Fault Tolerant Force Feedback Actuator for Steer–by–wire", First IFAC Conference on Mechatronic Systems, Sep. 20, 2000.*

Kim S., Kim Y., Kim H and Nam C., "Adaptive Reconfigurable Flight Control System Based on Recursive System Identification," JSASS (The Japan Society for Aeronautical and Space Sciences) 15th International Sessions in 39th Aircraft Symposium, Gifu, Japan, Oct. 29–31, 2001.

A.J. Calise, S. Lee and M. Sharma, "Direct Adaptive Reconfigurable Control of a Tailless Fighter Aircraft", American Institute of Aeronautics & Astronautics, AIAA–98–4108, pp. 1–10, 1998.

* cited by examiner

*Primary Examiner*—Kevin Hurley
(74) *Attorney, Agent, or Firm*—Brinks Hofer Gilson & Lione

(57) ABSTRACT

The present invention involves a system and method of re-configurable control for a vehicle steer-by-wire system. A steer-by-wire control system includes a steering wheel control system and a road wheel control system for a vehicle. Each control system is provided with a respective controlled plant and a re-configurable controller. The controllers receive output measurement signals from the respective controlled plants and produce control command signals for the controlled plants for re-configurable control of the steer-by-wire system. An adaptive re-configurable control is provided with fault detection and isolation, fault decision, parameter identification for the steer-by-wire controlled plant, and the re-configurable controllers with automatic adjustable structure and/or parameters. The re-configurable controllers automatically adjust their structure and parameters to maintain stability and certain performance requirements despite faults that occur in the steer-by-wire system.

32 Claims, 2 Drawing Sheets

RE-CONFIGURABLE CONTROL OF STEER-BY-WIRE SYSTEMS

BACKGROUND

1. Technical Field

The present invention relates generally to steer-by-wire systems, and more particularly relates to re-configurable control of steer-by-wire systems.

2. Background Information

Vehicle steering control systems, such as electric power steering control systems and steer-by-wire control systems, are electro-mechanical motion control systems with sensors, actuators, and other electrical and mechanical components. Such systems have become increasingly complex in recent years. It is important for such steering control systems to deal with faults in sensors, actuators, power electronics, and mechanical components. The fault tolerant operation and ability to deal with malfunctions is, therefore, a key issue for vehicle steering control systems, especially for full steer-by-wire systems.

For safe operation of the steer-by-wire control system, hardware redundancy for critical components can be used. However, it is limited by weight and package, cost, space, and similar installation environment for the hardware.

BRIEF SUMMARY

It is possible to eliminate or reduce redundant hardware and to enhance safety by using the analytic redundancy and re-configuration for controller structures and/or parameters of the steer-by-wire systems to maintain the system stability, integrity and certain performance requirements when faults occur in the steer-by-wire control systems.

The present invention provides a re-configurable control for a steer-by-wire system. The re-configurable control maintains the steer-by-wire system to be stable and controllable despite faults that occur in the sensors, actuators, and other mechanical or electrical components.

The steer-by-wire control system has an adaptive re-configurable control structure that is implemented in the steer-by-wire system in accordance with the present invention. This allows a steer-by-wire controller to re-configure its structure and/or parameters to satisfy requirements of stability, integrity and certain performance requirements for the steer-by-wire system.

An adaptive re-configurable control unit is provided with fault detection and isolation, fault decision, parameter identification for the steer-by-wire controlled plant, and a re-configurable controller with automatic adjustable structure and/or parameters.

A residual generator generates a series of residual signals based on the output and input signals of the steer-by-wire controlled plant. The residual signals are evaluated in a fault decision unit to determine whether or not the fault occurs. In the event of a failure, a fault decision signal is given to indicate the fault.

A parameter identifier estimates the model parameters of the steer-by-wire controlled plant in real time. Based on the result of the fault decision signal and the parameter identification, the re-configurable controller reconfigures its structure and/or parameters to compensate for the effects of the fault according to the stability and certain performance requirements of the overall steer-by-wire control system.

The present invention also provides a method of re-configurable control of fault tolerant steer-by-wire systems.

The present invention may include one or more of the following advantages and benefits. The re-configurable control of a steer-by-wire system provides enhanced fault tolerance and safety. Because redundant hardware is eliminated or minimized, the implementation of the re-configurable control results in weight reduction of the vehicle. The system is also cost efficient and has improved system performance and product quality compared to conventional steering systems when the re-configurable control of steer-by-wire system is used. Moreover, the system is easily implemented in embedded systems.

The foregoing discussion has been provided only by way of introduction. Nothing in this section should be taken as a limitation on the following claims, which define the scope of the invention.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale, emphasis instead being placed upon illustrating the principles of the invention. In the drawings.

DETAILED DESCRIPTION

Figure 1:
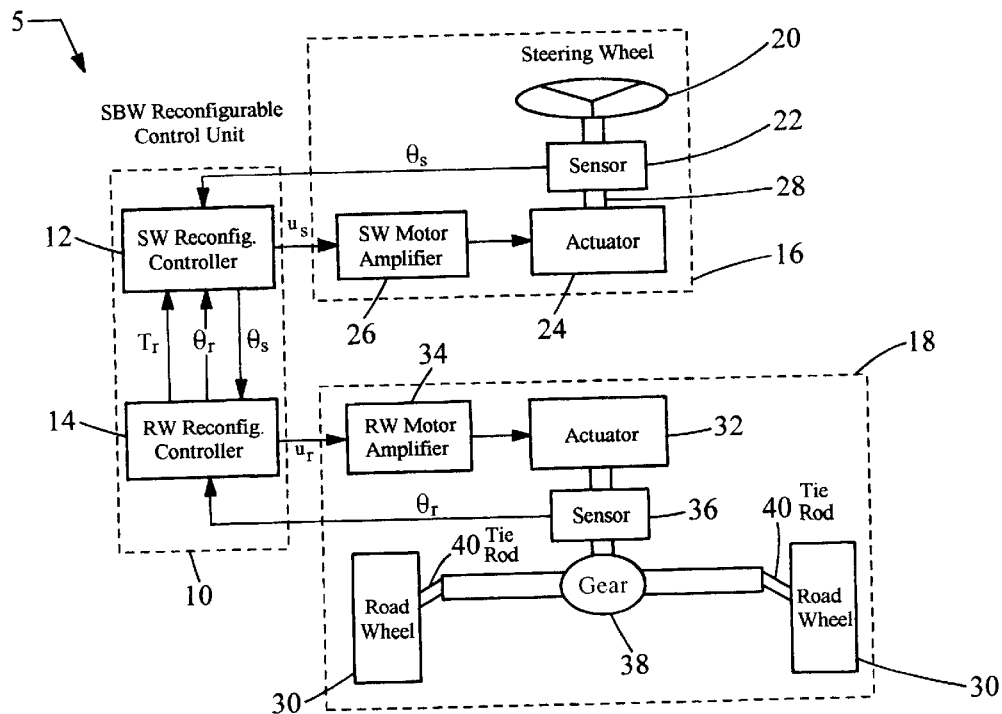
FIG. 1 is a schematic diagram of a steer-by-wire system with a reconfigurable control unit in accordance with the invention.

FIG. 1 illustrates an embodiment of a steer-by-wire system 5 in accordance with the present invention. The steer-by-wire system 5 includes a steering wheel controlled plant 16, a road wheel controlled plant 18, and a re-configurable control unit 10. The steering wheel controlled plant 16 and the road wheel controlled plant 18 are electro-mechanical systems that are controlled by the re-configurable control unit 10. The re-configurable control unit 10 receives the measured sensor signals from the steering wheel controlled plant 16 and road wheel controlled plant 18, and provides control commands to the steering wheel controlled plant 16 and road wheel controlled plant 18 to perform the required steering functions while maintaining system stability and certain performance requirements even if one or more faults occurs in the steer-by-wire system 5.

The steering wheel controlled plant 16 includes a steering wheel mechanism, such as a joystick or steering wheel 20, a steering wheel angle sensor 22, an electrical steering wheel motor actuator 24, a steering wheel motor amplifier 26, and a steering shaft 28 that connects the steering wheel 20, the sensor 22, and the steering wheel actuator 24 together.

The road wheel controlled plant 18 includes one or more road wheels 30, an electrical road wheel motor actuator 32, a road wheel motor amplifier 34, a road wheel angle sensor 36, a road wheel mechanism 38 (such as a gear and rack), and a pair of tie rods 40 that connect the road wheels 30 and road wheel mechanism 38 together. In some implementations, the road wheel controlled plant 18 includes two front road wheels and two rear road wheels, each having its own road wheel actuator and road wheel angle sensor.

The re-configurable control unit 10 includes a steering wheel re-configurable controller 12, which controls the operation of the steering wheel controlled plant 16, and a road wheel re-configurable controller 14, which controls the operation of the road wheel controlled plant 18.

The steering wheel re-configurable controller 12 receives the steering wheel angle $\theta_s$ from the sensor 22 and provides a steering wheel control command $u_s$ to the motor amplifier 26 of the steering wheel controlled plant 16. The road wheel re-configurable controller 14 receives the road wheel angle Or from sensor 36 and provides a road wheel control command $u_r$ to the motor amplifier 34 of the road wheel controlled plant 18.

In the illustrated embodiment, the steering wheel controlled plant 16 and its associated re-configurable controller 12 provide a steering control system, and the road wheel controlled plant 18 and its re-configurable controller 14 provide a road wheel control system. The steering control system and the road wheel control system are integrated as the steer-by-wire system 5 through signal transactions between the two controllers 12 and 14. As shown in FIG. 1, the steering wheel angle $\theta_s$ is sent to the road wheel re-configurable controller 14, and the road wheel angle $\theta_r$ and equivalent road wheel torque $\tau_r$ are sent to the steering re-configurable controller 12.

Figure 2:
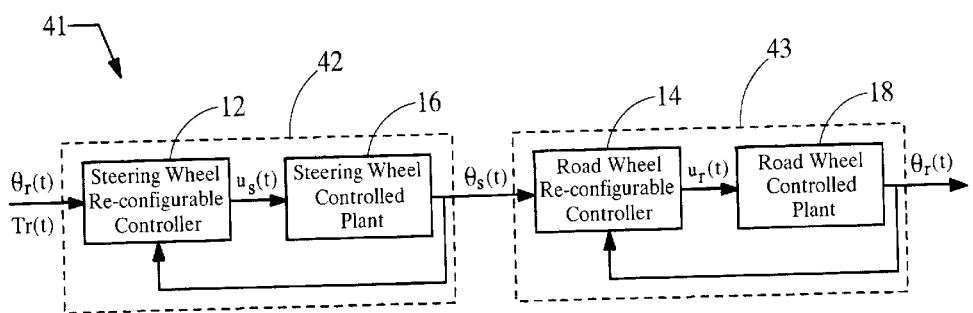
FIG. 2 is a schematic block diagram of a re-configurable steer-by-wire control system having a steering wheel control system and a road wheel control system.

FIG. 2 illustrates a schematic block diagram of a re-configurable steer-by-wire control system 41 having a steering wheel control system 42 and a road wheel control system 43. Therefore, in essence, FIG. 2 is a control system block diagram representation of the steer-by-wire system 5 shown in FIG. 1. As shown in FIG. 2, the steering wheel control system 42 includes the steering wheel controlled plant 16 and its associated re-configurable controller 12 shown in FIG. 1, and the road wheel control system 43 includes the road wheel controlled plant 18 and its re-configurable controller 14. The closed-loop feedback control for the steer-by-wire system 5 provides the expected steering functions.

In the steer-by-wire system shown in FIG. 2, the steering control system 42 provides the steering feel for the vehicle driver, the steering wheel reference command to the road wheel control system, and control functions for the steering wheel return rate. The road wheel control system 43 provides the control of the tracking of the road wheel angle to the steering wheel reference angle.

In accordance with the invention, the re-configurable control is implemented in either or both the road wheel control system 43 or the steering wheel control system 42. Both systems 42, 43 maintain stability and certain performance requirements even if one or more faults occur in the steering wheel controlled plant 16 and the road wheel controlled plant 18.

Since the steering wheel control system 42 and the road wheel control system 43 are similar in their hardware architectures including sensors, motor actuators, wheels and their assemblies, there is the same general structure for the re-configuration control of the steering wheel control system and road wheel control system shown in FIG. 2.

Figure 3:
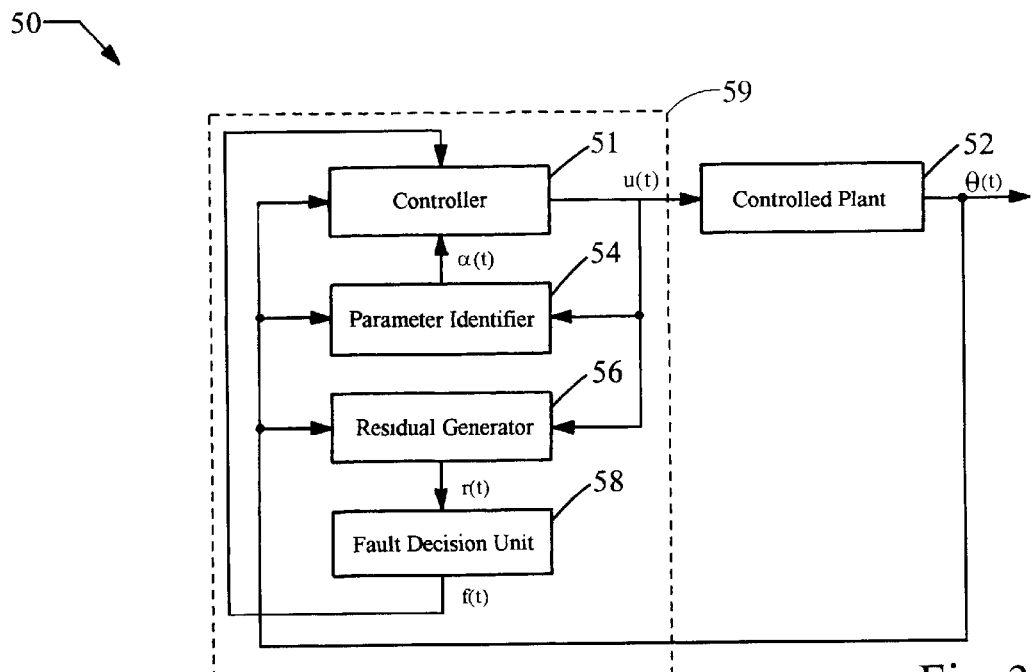
FIG. 3 is a block diagram of a re-configurable steer-by-wire control system in accordance with the invention.

FIG. 3 shows a block diagram of an adaptive re-configurable steer-by-wire control system generally identified as 50, corresponding to either the steering control system 42 or the road wheel control system 43 of FIG. 2. As shown, the steering wheel re-configurable controller 12 or the road wheel re-configurable controller 14 in FIG. 2 are represented generally by a control unit 59, and the steering wheel controlled plant 16 or the road wheel controlled plant 18 in FIG. 2 are represented generally by a controlled plant 52.

The re-configurable steer-by-wire control system 50 shown in FIG. 3 provides a general re-configuration control structure and includes the controller 51 that has functions of adjustable structure and parameters, a parameter identifier 54 that identifies the parameters of the controlled plant 52 in real time, a residual signal generator 56 that generates a residual signal in the presence of faults, and a fault decision unit 58 that determines faults.

The re-configurable steer-by-wire control system 50 shown in FIG. 3 performs the following tasks:

Detects and diagnoses sensor, actuator, and system component failures in the controlled plant 52;

Evaluates the severity of the failures;

Identifies the parameters of the controlled plant 52; and

Restructures the control laws and/or reschedules the control gain for the controller 51.

As shown in FIG. 3, the residual generator 56 produces residual signals r(t), using the inputs u(t) and outputs θ(t) of the controlled plant 52. A mathematical model of the controlled plant is used in the residual generator 56. The residual generator 56 then performs a consistency check between the controlled plant model and variables of the real controlled plant to produce the non-zero residual signal r(t) when any fault occur. The controlled plant models can be any kind of model, such as the state-space model discussed below.

Consider the following steer-by-wire controlled plant in the fault-free case described by the following state space equations:

$$\dot{x}(t)=Ax(t)+Bu(t) \tag{1}$$

$$y(k)=Cx(k) \tag{2}$$

where y(t), u(t) and x(t) are the input, output, and state, respectively, at time t, and A, B and C are constant matrices of the appropriate dimensions that describe the steer-by-wire controlled plant. The equations (1) and (2) describe the actual steer-by-wire controlled plant without faults.

The steer-by-wire controlled plant described in (1) and (2) will vary in presence of faults. The general description for the steer-by-wire controlled plant with faults is given as follows:

$$\dot{x}(t)=Ax(t)+Bu(t)+R_1f(t) \tag{3}$$

$$y(t)=Cx(t)+R_2f(t) \tag{4}$$

where $R_1$ and $R_2$ are known distribution constant matrices of faults, and f(t) is a fault vector, with each element representing a specific fault.

The residual r(t) is a signal that carries information on the time and location of the faults. It is near zero in the fault-free case and deviates from zero when a fault has occurred. Generally, the residual generator 56 which generates the residual signal r(t) is a type of state observer. The following gives a typical description for such a residual generator:

$$r(t)=x(t)-\hat{x}(t) \tag{5}$$

$$\dot{\hat{x}}(t)=A\hat{x}(t)+Bu(t)+K(y(t)-\hat{y}(t)) \tag{6}$$

where K is a constant matrix for the state observer (6).

The isolation of a specific fault $f_i(t)$ can be implemented in the residual generator 56. It can be represented as an element of the residual vector, $r_i(t)$, where i=1,2,3, . . . , q.

As shown in FIG. 3, the residual signals r(t) from the residual generator 56 is sent to the fault decision unit 58. The fault decision unit 58 evaluates the residuals and monitors if and where a fault has occurred. The decision function is represented by J(r(t)) and the following test is performed generally to determine a fault:

$$J(r(t)) \leq T(t) \text{ for } f(t)=0 \quad (7)$$

$$J(r(t)) > T(t) \text{ for } f(t) \neq 0 \quad (8)$$

where T(t) represents the threshold.

The isolation of a specific fault, such as the i th of possible faults, can be tested by:

$$J(r_i(t)) \leq T_i(t) \text{ for } f_i(t)=0 \quad (9)$$

$$J(r_i(t)) > T_i(t) \text{ for } f_i(t) \neq 0 \quad (10)$$

where i=1,2,3, . . . , q.

The model parameters of the controlled plant 52 are estimated by using a parameter identifier 54 in FIG. 3. The general state-space model of the parameter identifier is given by:

$$\dot{x}(t) = \hat{A}x(t) + \hat{B}u(t) \quad (11)$$

$$y(t) = \hat{C}x(t) \quad (12)$$

where $\hat{A}$, $\hat{B}$, and $\hat{C}$ are constant matrices with the identified parameters. The signal α(t) of the parameter identifier 54 in FIG. 3 represents the set of identified parameters.

As shown in FIG. 3, the controller 51 is an adaptive controller with the capability to update controller parameters or structure in real time according to the fault information f(t) from the fault decision unit 58 and the identified parameters α(t) from the parameter identifier 54. The controller parameters may be the simple gain or any parameters in the controller. As a result of the adaptive re-configuration of the controller, the effects of the fault occurring in sensors, actuators, and system components are compensated. Therefore, the steer-by-wire system shown in FIG. 3 will maintain stability and certain performance requirements.

The controller 51 described in the form of a state-space model is given as follows:

$$u(t) = -f(\hat{A}, \hat{B}, \hat{C})x(t) \quad (13)$$

where the function $f(\hat{A},\hat{B},\hat{C})$ is the parameter and structure adjustable.

The controller 51 shown in equation (13) can be implemented with different control algorithms. For example, in some implementations, the controller 51 is a simple proportional controller in the following form:

$$u(t) = K_p(\hat{A},\hat{B},\hat{C})e(t) \quad (14)$$

where $K_p(\hat{A},\hat{B},\hat{C})$ is a proportional parameter which varies with the controlled plant parameters (A, B,C), and e(t) is the error signal between the reference signal and the output signal generally in the control system. Under a conventional proportional control, the value of the parameter $K_p$ remains constant. However, in the re-configurable steer-by-wire control system 50, the parameter identifier 54 provides the controlled plant parameters such that the controller parameter $K_p$ varies with the identified plant parameters $\hat{A},\hat{B},\hat{C}$ in real time when the fault occurs to cause the plant parameters to vary.

The adaptive re-configurable control for the steer-by-wire system 50 shown in FIG. 3 minimizes the need for redundant hardware and enhances safety by reconfiguring the control strategy. Rather than using hardware redundancy, the steer-by-wire control system 50 uses analytical redundancy and a re-configurable control algorithm to be tolerant of faults of sensors, actuators, and system components in the steer-by-wire system.

Figure 4:
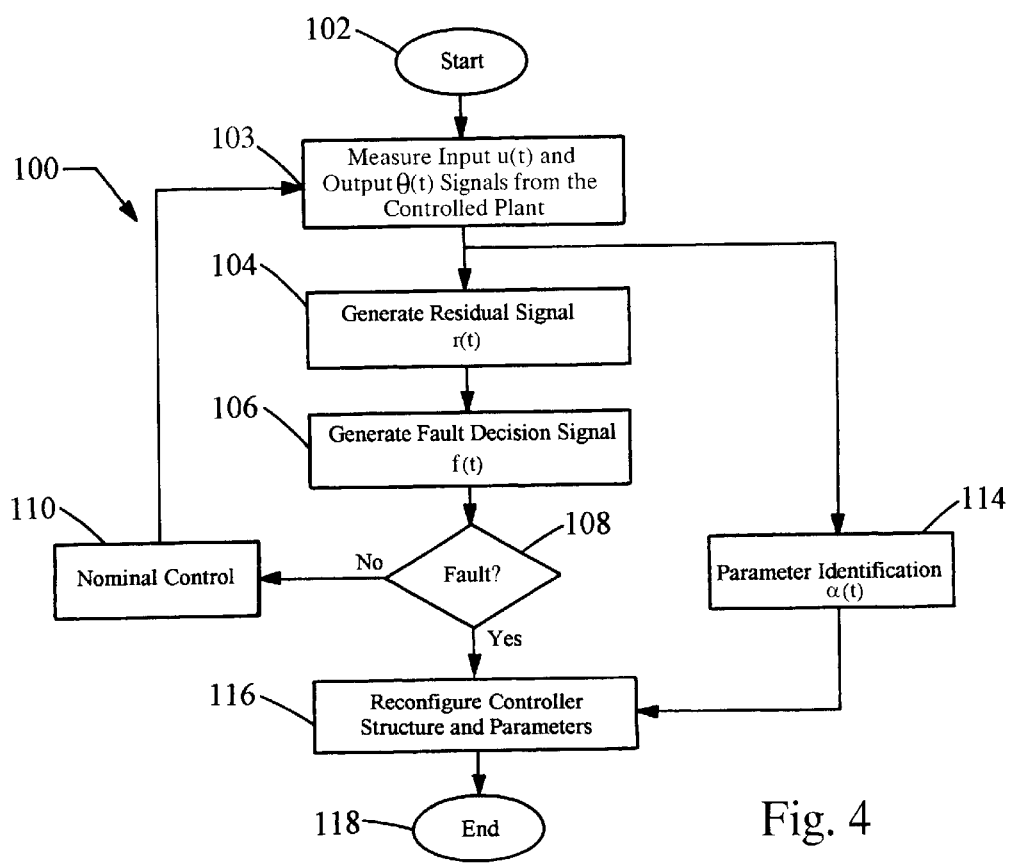
FIG. 4 is a flow diagram of a sequence of steps performed by the re-configurable steer-by-wire control system of FIG. 2 in accordance with the invention.

Referring now to FIG. 4, there is shown a process 100 that depicts a general procedure performed during the operation of the adaptive re-configurable control for the steer-by-wire system 50 of FIG. 3. The process 100 initializes in step 102. The input signal u(t) and the output signal θ(t) of the controlled plant 52 are captured in step 103. In step 104, the failure residual generator 56 generates the residual signal r(t) to indicate the fault-free with near zero residual or a deviate from zero when a fault occurs. For example, the residual signal is 0.1° for a road wheel angle sensor measurement without fault and varies to 2° with a fault at a time t.

Subsequently, in step 106, the fault decision unit 58 generates the fault isolation and decision signal f(t) that is based on the residual signal r(t) and the decision algorithm. The fault signal f(t) indicates that the residual signal r(t) is larger than the threshold which represents the acceptable range. The fault signal f(t) carries information on the time and location of the faults.

Accordingly, if the process 100 decides in step 108 that there is no fault in the steer-by-wire control system, then the process proceeds to step 110, indicating that the steer-by-wire control system 50 is operating in its normal mode, and returns to step 103 to capture the input signal and the output signal of the controlled plant 52 and step 104 to repeat the fault detection, isolation and decision in steps 104 and 106. If, on the other hand, the process 100 decides that there is a fault, then the fault signal f(t) is sent to step 116 which is the re-configurable control algorithm.

In the meantime, the parameter identifier 54 identifies the appropriate parameters of the controlled plant 52 in step 114. The identified parameters α(t) in step 114 and the fault signal f(t) in steps 106 and 108 are sent together to step 116. In step 116, the controller 51 re-configures its structure and/or adjusts its parameters according to the fault signal f(t) and the identified parameters α(t). Subsequently, the process 100 ends in step 118.

In sum, the steer-by-wire control system is an adaptive re-configurable control system that compensates for faults occurring in one or more sensor, actuator, and other components that could compromise the operation of the system. The adaptive re-configurable steer-by-wire control system has the ability to maintain system stability and certain performance requirements through a methodology where the controller automatically re-configures its structure and/or parameters when the fault occurs.

It is therefore intended that the foregoing detailed description be regarded as illustrative rather than limiting, and that it be understood that it is the following claims, including all equivalents, that are intended to define the spirit and scope of this invention.

What is claimed is:

1. A re-configurable steer-by-wire control system of a vehicle, comprising:
   a steering wheel control system including a steering wheel controlled plant and a steering wheel controller for producing steering feel for a driver and generating a road wheel reference command;
   a road wheel control system including a road wheel controlled plant and a road wheel controller for controlling the road wheels of the vehicle to track the road wheel reference command, the controllers receiving output measurement signals from the respective controlled plants and producing control command signals for the respective controlled plants to implement the re-configurable control of the steer-by-wire system, and each controller being re-configurable to maintain stability and certain performance requirements of the steer-by-wire system despite faults that occur in the steer-by-wire system.

2. The system of claim 1 wherein the controlled plants include sensors, actuators, wheels and mechanical or electrical components.

3. The system of claim 2 wherein the re-configurable control maintains stability and certain performance requirements despite faults that occur in the sensors, actuators, and mechanical or electrical components in-the controlled plants.

4. The system of claim 1 wherein the controllers are implemented with a re-configurable control algorithm to provide an adaptive re-configurable control structure for the steer-by-wire system so that the controllers are able to re-configure their structure and parameters to satisfy stability and certain performance requirements despite faults that occur in the steer-by-wire system.

5. The system of claim 4 wherein the adaptive re-configurable control compensates for the effects of the faults according to the stability and certain performance requirements of the steer-by-wire control system.

6. The system of claim 1 wherein each of the steering and road wheel control systems has adaptive re-configurable control capability and provides fault detection and isolation, fault decision, parameter identification, and re-configurable control for the controlled plants.

7. The system of claim 1 wherein each of the steering and road wheel controllers includes a residual generator which generates a series of residual signals based on the received output measurement signals and control command signals of the controlled plants, a fault decision unit which determines whether or not a fault occurs based on the residual signals and generates a fault decision signal, a parameter identifier which estimates parameters of a model of the respective controlled plants in real time, and a controller being able to reconfigure its structure and parameters based on the result of the fault decision and the controlled plant model parameter estimation.

8. The system of claim 7 wherein the residual generators generate residual signals based on output measurement signals and input control command signals of the controlled plants.

9. The system of claim 8 wherein each residual generator performs a consistency check between estimated variables of the controlled plant and variables of the actual controlled plant to produce non-zero residual signals when one or more faults occur and near-zero residual signals when no fault occurs.

10. The system of claim 9 wherein each residual generator isolates a specific fault that is represented as an element of a residual signal vector.

11. The system of claim 7 wherein the fault decision units generate the fault decision signals based on residual signals from the residual generators using test rules.

12. The system of claim 11 wherein the fault decision units evaluate the residual signals and monitor whether or not a fault has occurred for the specific component using the test rules according to a required threshold.

13. The system of claim 7 wherein the parameter identifiers generate the estimated parameters of the controlled plant models based on the output measurement signals and control command signals of the actual controlled plants.

14. The system of claim 7 wherein the controllers reconfigure their structures and parameters in real time based on reference signals and fed measurement signals from the controlled plants, fault signals from the fault decision units, and identified parameters from the parameter identifiers.

15. The system of claim 14 wherein the parameters and structures of the controllers are adjusted according to the fault decision signals and the identified parameters of the controlled plants.

16. The system of claim 14 wherein each controller is operable with more than one type of control algorithm.

17. The system of claim 1 wherein an adaptive re-configurable control of the steer-by-wire system compensates for faults occurring in sensors, actuators, and system components in the controlled plants.

18. A method of re-configurable control of a steer-by-wire control system for a vehicle, comprising, providing a steering wheel control system including a steering wheel controlled plant and a steering wheel controller for producing steering feel for a driver and generating a road wheel reference command;

providing a road wheel control system including a road wheel controlled plant and a road wheel controller for controlling the road wheels of the vehicle to track the road wheel reference command;

receiving output measurement signals from the respective controlled plants and control command signals from the respective controllers for the re-configurable control of the steer-by-wire system; and providing re-configurable control for the steer-by-wire system including the steering wheel control system and the road wheel control system implementing the steering wheel controller and road wheel controller to maintain system stability and certain performance requirements despite faults that occur in the steer-by-wire system.

19. The method of claim 18 wherein the re-configurable control of the steer-by-wire system includes maintaining system stability and certain performance requirements despite faults that occur in sensors, actuators, and mechanical or electrical components of the controlled plants.

20. The method of claim 18 further comprising implementing a re-configurable control algorithm in the controllers to provide an adaptive re-configurable control structure for the steer-by-wire system so that the controllers are able to re-configure their structure and parameters to satisfy stability and certain performance requirements despite faults that occur in the steer-by-wire control system.

21. The method of claim 20 wherein the adaptive re-configurable control compensates for the effects of the faults according to the stability and certain performance requirements of the steer-by-wire control system.

22. The method of claim 18 wherein re-configurable control of the steer-by-wire system includes fault detection and isolation, fault decision, parameter identification, and re-configurable control for the controlled plants.

23. The method of claim 18 wherein each of the steering wheel and road wheel controllers generates a series of residual signals based on the received output measurement signals and control command signals of the controlled plants in a respective residual generator, determines whether or not a fault occurs based on the residual signals and generates a fault decision signal in a respective fault decision unit, estimates parameters of a model of the controlled plants in real time in a respective parameter identifier based on the result of the fault decision and the controlled plant model parameter estimation.

24. The method of claim 23 wherein the residual generators generate residual signals based on the output measurement signals and control command signals of the controlled plants.

25. The method of claim 24 wherein each residual generator performs a consistency check between estimated variables of the controlled plant and variables of the actual controlled plant to produce non-zero residual signals when one or more faults occur and near-zero residual signals when no fault occurs.

26. The method of claim 25 wherein each residual generator isolates a specific fault that is represented as an element of a residual signal vector.

27. The method of claim 23 wherein the fault decision units generate the fault decision signals based on residual signals from the residual generators using test rules.

28. The method of claim 27 wherein the fault decision units evaluate the residual signals and monitor whether or not a fault has occurred for the specific component using the test rules according to a required threshold.

29. The method of claim 23 wherein the parameter identifiers generate the estimated parameters of the controlled plant models based on the output measurement signals and the control command signals of the actual controlled plants.

30. The method of claim 23 wherein the controllers reconfigure their structure and parameters in real time based on reference signals and fed measurement signals form the controlled plants, fault signals from the fault decision units, and identified parameters from the parameter identifiers.

31. The method of claim 30 wherein the parameters and structures of the controllers are adjusted according to the fault decision signals and the identified parameters of the controlled plants.

32. The method of claim 30 wherein each controller is operable with more than one type of control algorithm.

* * * * *

UNITED STATES PATENT AND TRADEMARK OFFICE
CERTIFICATE OF CORRECTION

PATENT NO. : 6,729,432 B1 Page 1 of 1
DATED : May 4, 2004
INVENTOR(S) : Yixin Yao et al.

It is certified that error appears in the above-identified patent and that said Letters Patent is hereby corrected as shown below:

Column 7,
Line 16, after "components" delete "in-the" and substitute -- in the -- in its place.

Signed and Sealed this

Seventeenth Day of August, 2004

JON W. DUDAS
*Acting Director of the United States Patent and Trademark Office*